United States Patent
Chiba et al.

(10) Patent No.: US 6,713,521 B2
(45) Date of Patent: Mar. 30, 2004

(54) METHOD OF PREPARING RIGID POLYURETHANE FOAM AND COMPOSITION OF RIGID POLYURETHANE FOAM

(75) Inventors: Takanori Chiba, Osaka (JP); Takuya Matsumoto, Osaka-Pref (JP); Keiji Ono, Hyogo-Pref (JP); Takehiro Shimizu, Hyogo-Pref (JP)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/538,786

(22) Filed: Mar. 30, 2000

(65) Prior Publication Data

US 2003/0060526 A1 Mar. 27, 2003

(30) Foreign Application Priority Data

Apr. 8, 1999 (JP) ............................ 11-101245

(51) Int. Cl.⁷ ............................... C08G 18/28
(52) U.S. Cl. .................. 521/167; 521/131; 521/170; 521/174
(58) Field of Search ................ 521/131, 167, 521/170, 174

(56) References Cited

U.S. PATENT DOCUMENTS

| | | | |
|---|---|---|---|
| 5,648,019 A | | 7/1997 | White, III et al. ...... 252/182.24 |
| 5,840,781 A | * | 11/1998 | Dietrich et al. ............. 521/167 |
| 5,886,062 A | * | 3/1999 | Dietrich et al. ............. 521/131 |
| 5,962,542 A | | 10/1999 | Dietrich et al. ............. 521/131 |
| 6,005,016 A | * | 12/1999 | Nodelman et al. .......... 521/174 |

FOREIGN PATENT DOCUMENTS

| | | |
|---|---|---|
| EP | 0826708 | 3/1998 |
| JP | 20-00128951 | 5/2000 |
| WO | 97/16477 | 5/1997 |
| WO | 97/35899 | 10/1997 |

* cited by examiner

Primary Examiner—John M. Cooney, Jr.
(74) Attorney, Agent, or Firm—Joseph C. Gil; John E. Mrozinski, Jr.

(57) ABSTRACT

A method of preparing a rigid polyurethane foam having improved thermal conductivity, and a composition for such rigid polyurethane foam is provided. In the preparation a rigid polyurethane foam from a composition comprising an aromatic polyisocyanate, a polyol, a blowing agent, a catalyst, a surfactant and other aids, the blowing agent is a blend of cyclopentane and water, and the polyol contains a polyether polyol prepared by addition-polymerizing an alkylene oxide to o-toluenediamine as an initiator.

7 Claims, No Drawings

METHOD OF PREPARING RIGID POLYURETHANE FOAM AND COMPOSITION OF RIGID POLYURETHANE FOAM

FIELD OF THE INVENTION

The present invention relates to a method of preparing a rigid polyurethane foam, and a composition for rigid polyurethane foam. The rigid polyurethane foam can be utilized as thermally insulating material for freezers, refrigerators, buildings and the like.

BACKGROUND OF THE INVENTION

Rigid polyurethane foam has widely been used as thermally insulating material for refrigerators, e.g. domestic refrigerator, because of low product density, excellent insulating properties and high mechanical strength.

As the blowing agent for production of rigid polyurethane foam, halogen-substituted chlorofluorocarbon (hereinafter abbreviated to CFC), particularly trichlorofluoromethane, R-11) has hitherto been used.

However, since this blowing agent R-11 contains halogen, there is a fear that environmental pollution or disruption such as possibility of depletion of the ozone layer in the stratosphere and global warming are caused. For the purpose of protecting the global environment, the production and consumption of CFC are controlled in the world.

DETAILED DESCRIPTION OF THE INVENTION

In Japan, the production of CFC had been prohibited before the end of 1995. As a novel blowing agent as a substitute, for example, hydrochlorofluorocarbon (HCFC) having a small ozone depletion coefficient is used. For example, HCFC-141b (1,1-dichloro-1-fluoroethane), HCFC-22 (chlorodifluoromethane) and HCFC-142b (1-chloro-1,1-difluoroethane) are introduced and applied as the blowing agent.

However, HCFC as a substitute of CFC exerts a small influence on the ozone layer, but still has characteristics of depleting the ozone layer, because chlorine atoms are contained in the molecule. A reduction in service amount of HCFC is performed by stages. Accordingly, use of a blowing agent having no influence on depletion of the ozone layer has been suggested now in view of the protection of the global environment. In some applications, there has already been introduced and applied a blowing agent which contains no chlorine atom to be secured against depletion of the ozone layer, e.g. cyclopentane.

However, cyclopentane is a blowing agent, which does not exert a harmful influence on the global environment, but has some problems. The thermal conductivity of a cyclopentane gas itself is comparatively high and insulating performances of a rigid polyurethane foam using cyclopentane are inferior to those of a conventional foam using HCFC-141b and, therefore, an improvement in thermally insulating performances is required. Particularly, an improvement in thermally insulating performances at a low temperature range is required. Cyclopentane itself is hardly soluble in a conventionally used polyol and, when using a large amount of cyclopentane to reduce the density of the foam, the stability of a premix is poor. On the other hand, there is suggested a technique of preparing a so-called emulsion foam by mechanically dispersing a comparatively large amount of cyclopentane in a polyol (Japanese Patent Application No. 10-303794(303794/1998)), and the resulting emulsion foam exhibits comparatively good insulating characteristics at a low temperature range. However, this technique requires a special equipment.

To solve these problems and to produce a thermally insulating material having improved thermal conductivity, the thermal conductivity of the rigid foam as a product can be reduced by using, as a blowing agent, a mixture of a considerably large amount of cyclopentane and a small amount of water. That is, the thermal conductivity can be reduced by preparing a cyclopentane-rich gas in a cell. By using, as a main portion of a polyol, a polyether polyol prepared by addition-polymerizing an alkylene oxide to o-toluenediamine as an initiator, a stable premix can be prepared even if a large amount of the blowing agent is dissolved in the polyol. Therefore, the density of the foam can be reduced.

The present invention provides a method of preparing a rigid polyurethane foam from a composition comprising an aromatic polyisocyanate, a polyol, a blowing agent, a catalyst, a surfactant and other aids, characterized in that the blowing agent is a combination of cyclopentane and water, and the polyol contains a polyether polyol prepared by addition-polymerizing an alkylene oxide to o-toluenediamine as an initiator.

The present invention also provides a composition for rigid polyurethane foam, comprising:
(1) an aromatic polyisocyanate,
(2) a polyol containing a polyether polyol prepared by addition-polymerizing an alkylene oxide to o-toluenediamine as an initiator,
(3) a blowing agent comprising cyclopentane and water, and
(4) a catalyst, a surfactant and other aids.

A rigid polyurethane foam to be used as thermally insulating material for refrigerators can be produced from this composition.

The aromatic polyisocyanate (1), for example, polyisocyanates such as tolylene diisocyanate (TDI), diphenylmethane diisocyanate (MDI) and polymethylene polyphenyl polyisocyanate (polymeric MDI) and modified polyisocyanates thereof may be used alone or in combination.

A modified polyvalent isocyanate, i.e. a product obtained by a partial chemical reaction of organic di- and/or polyisocyanates can be used. For example, there can be used di- and/or polyisocyanates, which contain an ester, urea, buret, allophanate, carbodiimide, isocyanurate and/or urethane group can be used.

The amount of the aromatic polyisocyanate (1) in the composition may be within a range from 100 to 140 parts by weight, preferably from 115 to 140 parts by weight, particularly from 120 to 130 parts by weight, based on 100 parts by weight of the polyol.

A polyol (2), a blowing agent (3) and an aid (4) constitute a polyol mixture.

The polyol (2) is preferably a polyether polyol and/or a polyester polyol. The polyether polyol is obtained by addition-polymerizing an alkylene oxide (e.g. propylene oxide and/or ethylene oxide) to a reactive starting material, for example, a polyhydric alcohol such as ethylene glycol, propylene glycol, glycerin, trimethylolpropane, pentaerythritol, sorbitol, sucrose and bisphenol A; or an aliphatic amine such as triethanolamine and ethylenediamine, or an aromatic amine such as toluenediamine and methylenedianiline (MDA).

The polyether polyol can be obtained by addition-polymerizing an alkylene oxide to a reactive starting material containing 2–8 reactive hydrogen atoms, preferably 3–8 reactive hydrogen atoms, in the molecule by anionic polymerization in the presence of a catalyst such as alkali hydroxide (e.g. potassium hydroxide and sodium hydroxide) or alkali alcoholate (e.g. potassium methylate and sodium methylate) using a conventionally known method. The polyether polyol can be obtained by adding an alkylene oxide to a reaction starting material due to cationic polymerization in the presence of a catalyst such as Lewis acid (e.g. antimony pentachloride and boron fluoride etherate).

Suitable alkylene oxide includes, for example, tetrahydrofuran, ethylene oxide, 1,3-propylene oxide, 1,2- or 2,3-butylene oxide, 1,2-propylene oxide and styrene oxide. Among them, ethylene oxide and 1,2-propylene oxide are particularly preferred. These alkylene oxides can be used alone or in combination.

The reactive starting material (i.e. initiator) includes, for example, polyhydric alcohols (e.g. ethylene glycol, propylene glycol, glycerin, trimethylolpropane, pentaerythritol, sorbitol, sucrose and bisphenol A), alkanolamines (e.g. ethanolamine, diethanolamine, N-methyl- and N-ethyl-ethanolamine, N-methyl- and N-ethyl-diethanolamine, triethanolamine), and ammonia. Furthermore, aliphatic amines and aromatic amines can be used. Examples thereof include ethylenediamine, diethylenetriamine, 1,3-propylenediamine, 1,3- or 1,4-butylenediamine, 1,2-, 1,3-, 1,4-, 1,5- and 1,6-hexamethylenediamine, phenylenediamine, o-toluenediamine, m-toluenediamine, methylenedianiline (MDA) and polymethylenedianiline (P-MDA).

As the polyester polyol, there can be used, for example, a polyester polyol such as polyethylene terephthalate, which is prepared from a polycarboxylic acid (e.g. dicarboxylic acid and tricarboxylic acid) and a polyhydric alcohol (e.g. a diol and a triol). Preferred polyester polyols can be produced from a dicarboxylic acid having 2 to 12 carbon atoms and a diol having 2 to 12 carbon atoms, preferably 2 to 6 carbon atoms.

The dicarboxylic acid includes, for example, succinic acid, glutaric acid, adipic acid, suberic acid, azelaic acid, sebacic acid, decanedicarboxylic acid, maleic acid, phthalic acid, isophthalic acid and terephthalic acid. In place of the free carboxylic acid, a corresponding carboxylic acid derivative such as dicarboxylic acid monoester or diester with an alcohol having 1 to 4 carbon atoms, or a dicarboxylic anhydride can be used.

As the diol, there can be used, for example, ethylene glycol, diethylene glycol, 1,2- or 1,3-propanediol, dipropylene glycol, 1,4-butanediol, 1,5-pentanediol, 1,6-hexanediol and 1,10-decanediol. As the triol, for example, glycerin and trimethylolpropane can be used.

A lactone-based polyester polyol can be also used.

The polyol preferably has a functionality within a range from 3 to 8, and particularly from 3 to 6. Those having a hydroxyl value within a range from 200 to 900 mg KOH/g, e.g. from 300 to 800 mg KOH/g, preferably from 350 to 550 mg KOH/g are preferred.

The polyol (2) contains, as a main portion, a polyether polyol (2a) prepared by addition-polymerizing an alkylene oxide (e.g. propylene oxide and/or ethylene oxide) to o-toluenediamine (2,3-diaminotoluene and 3,4-diaminotoluene) as an initiator. The polyether polyol (2a) preferably has a hydroxyl value of 350 to 550 mg KOH/g.

The polyol (2) may be composed only of the polyether polyol (2a), or may be a mixture of the polyether polyol (2a) with another polyether polyol and/or a polyester polyol. The amount of the polyether polyol (2a) may be at least 50% by weight, e.g. 60 to 90% by weight, particularly 70 to 80% by weight, based on the polyol (2).

For example, the polyol (2) can be obtained by addition-polymerizing an alkylene oxide to a mixture of o-toluenediamine with other initiators (e.g. polyhydric alcohols, alkanolamines, aliphatic amines and aromatic amines) in a molar ratio of, for example, 60:40 to 99:1.

By using this polyether polyol (2a), a stable polyol premix can be prepared even if a large amount of the blowing agent (3) is used.

The polyol (2) may be a polyether polyol and/or polyester polyol having high compatibility with cyclopentane.

The term "high compatibility with cyclopentane" used herein means that the solubility of cyclopentane in the polyol is at least 25 g, e.g. at least 50 g, particularly at least 100 g. The solubility refers to the number of grams of cyclopentane which dissolves in 100 g of the polyol at 25° C.

As the blowing agent (3), for example, cyclopentane and water are used. The cyclopentane may be used in the amount within a range from 15 to 40 parts by weight, preferably from 18 to 25 parts by weight, and particularly preferably from 18 to 21 parts by weight, based on 100 parts by weight of the polyol mixture. Water is used in the amount of at most 1.0 part by weight, preferably from 0.1 to 0.7 part by weight, particularly preferably from 0.5 to 0.7 part by weight, based on 100 parts by weight of the polyol mixture.

As the aid (4) (e.g. catalyst, surfactant, and other aids), for example, conventionally known aids can be used. As the catalyst, for example, an amine catalyst and a metal catalyst can be used. As the amine catalyst, tertiary amines such as triethylenediamine, tetramethylhexamethylenediamine, pentamethyldiethylenetriamine and methyl morpholine can be used. As the metal catalyst, organometallic compounds such as stannous octoate, dibutyltin dilaurate and lead octylate can be used. The amount of the catalyst is within a range from 0.01 to 5 parts by weight, particularly preferably from 0.05 to 2.5 parts by weight, based on 100 parts by weight of the polyol.

As the surfactant, for example, conventional organosilicon compounds can be used. The amount of the surfactant is within a range from 0 to 5 parts by weight, particularly preferably from 0.5 to 3 parts by weight, based on 100 parts by weight of the polyol.

In the present invention, other aids such as foam stabilizers, foam inhibitors, fillers, dyes, pigments, flame retardants and hydrolysis inhibitor can be used in a proper amount.

In the present invention, the isocyanate index [(ratio of equivalent of isocyanate group in polyisocyanate (1) to equivalent of active hydrogen in polyol mixture)×100] is preferably within a range from 100 to 120, particularly from 105 to 110.

The rigid polyurethane foam can be prepared in a batch or continuous process by a prepolymer or one-shot method using a well-known foaming apparatus. Particularly preferred is a method of processing according to the two-component method [component A: polyisocyanate (1), component B: polyol premix (which is a polyol mixture obtained by mixing the polyol (2), the blowing agent (3) and the aid (4))]. The component A and component B can be mixed at a temperature of 5 to 50° C. (particularly 15 to 35° C.), poured into a mold having temperature adjusted within a range from 20 to 70° C. (particularly 35 to 45° C.), and then foamed to give a rigid polyurethane foam.

EXAMPLES

Example 1

71 Parts by weight of polyol L, 20 parts by weight of polyol J, 7 parts by weight of polyol F and 2 parts by weight of polyol G were mixed with an amine catalyst (1.1 parts by weight of tetramethylhexamethylenediamine, 0.8 part by weight of pentamethyldiethylenetriamine and 0.2 part by weight of N-methylimidazole), 2 parts by weight of a surfactant (SZ 1684, manufactured by Japan Unikar Co.) and 0.5 part by weight of water to prepare a liquid polyol mixture. To the liquid polyol mixture, 19.1 parts by weight of cyclopentane as a blowing agent was added to prepare a final polyol mixture. This polyol mixture was charged into a high-pressure foaming machine and mixed with circulating under high pressure for a while. According to the mixing ratio shown in Table 1, the polyol mixture and polymeric MDI (NCO content: 31.5%) were mixed (isocyanate index: 105) and foamed. After adjusting the temperature of the urethane raw material to 20° C., the urethane raw material was poured into an aluminum mold (600 mm×400 mm×50 mm) adjusted to 45° C. and then a molded article was removed from the mold after 7 minutes. Physical properties of the molded article are shown in Table 1.

Example 2

A liquid polyol mixture is prepared in accordance with Table 1. Example 1 was repeated, except for using SO-807-172 manufactured by Japan Unikar Co. as a silicon surfactant.

Comparative Examples 1 to 2

In the same manner as in Example 1, a polyol mixture liquid was prepared in accordance with Table 1. Then, cyclopentane was added and the mixture was charged into a high-pressure foaming machine to give a molded article in the same manner as in Example 1.

Comparative Example 3

30 Parts by weight of polyol A, 25 parts by weight of polyol B, 20 parts by weight of polyol C, 10 parts by weight of polyol D and 15 parts by weight of polyol E were mixed with an amine catalyst (1.8 parts by weight of tetramethylhexamethylenediamine, 1.0 part by weight of pentamethyldiethylenetriamine and 0.5 part by weight of trisdimethylaminopropyl-s-triazine), 2 parts by weight of a surfactant (L6900, manufactured by Japan Unikar Co.) and 0.5 part by weight of water to prepare a liquid polyol mixture. To the liquid polyol mixture, 21 parts by weight of cyclopentane as a blowing agent was added, followed by dispersing with mixing mechanically using a stirrer with a stirring blade of 7 cm in size at 2000 rpm to prepare a final polyol mixture. This polyol mixture was charged into a high-pressure foaming machine with a static mixer and mixed with circulating under high pressure for a while. According to the mixing ratio shown in Table 1, the polyol mixture and polymeric MDI were mixed and foamed. After adjusting the temperature of the urethane raw material to 20° C., the urethane raw material was poured into an aluminum mold (600 mm×400 mm×50 mm) adjusted to 45° C. and then a molded article was removed from the mold after 7 minutes. Physical properties of the molded article are shown in Table 1.

In contrast to Examples 1–2 and Comparative Examples 1–2, the liquid polyol mixture does not dissolve cyclopentane and forms an emulsion.

The physical properties of the molded articles obtained in Examples 1 and comparative Examples 1–3 were measured in the following procedures. The results are shown in Table 1.

Compression Strength

A sample 50 mm cube from the core portion of the foam was compressed in the direction perpendicular to that of flow (at a head speed of 10 mm/min.) and a pressure at which displacement reached 10% was measured.

Core Form Density

The density at the center portion of the foam, other than the surface portion, was measured.

Thermal Conductivity

Using a sample having a size of 200 mm×200 mm×25 mm obtained by cutting from the core portion of the foam, the thermal conductivity was measured by a thermal conductivity measuring apparatus (Autolambda) manufactured by Eiko Seiki Co., Ltd.

Compatibility with Pentane

After weighing 100 g of a polyol mixture liquid (excluding blowing agent) in a test tube having a screw stopper, a predetermined amount of cyclopentane was added and mixed. The mixture was allowed to stand and the appearance was observed. When the mixture was transparent, it was concluded that the cyclopentane had been dissolved.

TABLE 1

|  | Example 1 | Example 2 | Comparative Example 1 | Comparative Example 2 | Comparative Example 3 |
| --- | --- | --- | --- | --- | --- |
| Polyol A | — | — | — | — | 30 |
| Polyol B | — | — | — | — | 25 |
| Polyol C | — | — | — | — | 20 |
| Polyol D | — | — | — | — | 10 |
| Polyol E | — | — | — | — | 15 |
| Polyol F | 7 | 7 | — | — | — |
| Polyol G | 2 | 2 | — | — | — |
| Polyol H | — | — | 15 | — | — |
| Polyol J | 20 | 10 | — | — | — |
| Polyol K | — | — | 40 | 50 | — |
| Polyol L | 71 | 81 | — | — | — |
| Polyol M | — | — | 45 | 40 | — |
| Polyol N | — | — | — | 10 | — |
| Cyclopentane | 19.1 | 19.6 | 15.5 | 11.2 | 21 |
| Water | 0.5 | 0.5 | 1.3 | 2.0 | 0.5 |
| Polymeric MDI | 122 | 127 | 123 | 140 | 170 |
| Compression strength (kg/cm$^2$) | 1.7 | 1.9 | 1.5 | 2.0 | 2.0 |

TABLE 1-continued

| | | Example 1 | Example 2 | Comparative Example 1 | Comparative Example 2 | Comparative Example 3 |
|---|---|---|---|---|---|---|
| Foam core density (kg/cm$^3$) | | 32 | 32 | 32 | 35 | 35 |
| Thermal conductivity ×10$^{-4}$ (kcal/mh/° C.) | 25° C. | 161 | 162 | 163 | 173 | 163 |
| | 10° C. | 152 | 158 | 158 | 168 | 154 |
| | 0° C. | 150 | 152 | 156 | 166 | 150 |
| Compatibility of pentane | | dissolved | dissolved | dissolved | dissolved | not dissolved |

Polyol A
  Polyol prepared by adding ethylene oxide (EO) and propylene oxide (PO) (a weight ratio of EO to PO is from 20:80) to sorbitol as a starting material, having a hydroxyl value of 550 mg KOH/g.
Polyol B
  Polyol prepared by adding PO to glycerin as a starting material, having a hydroxyl value of 520 mg KOH/g.
Polyol C
  Polyol prepared by adding EO to trimethylolpropane as a starting material, having a hydroxyl value of 550 mg KOH/g.
Polyol D
  Polyol prepared by adding PO to trimethylolpropane as a starting material, having a hydroxyl value of 865 mg KOH/g.
Polyol E
  Polyester polyol prepared from polyethylene terephthalate, having a hydroxyl value of 315 mg KOH/g
Polyol F
  Polyol prepared by adding PO to trimethylolpropane as a starting material, having a hydroxyl value of 870 mg KOH/g.
Polyol G
  Glycerin
Polyol H
  Polyester polyol prepared from phthalic acid and diethylene glycol, having a hydroxyl value of 420 mg KOH/g.
Polyol J
  Polyester polyol prepared from phthalic acid and diethylene glycol, having a hydroxyl value of 235 mg KOH/g.
Polyol K
  Polyol prepared by adding PO to m-toluenediamine/diethanolamine (molar ratio of 75:25) as a starting material, having a hydroxyl value of 450 mg KOH/g.
Polyol L
  Polyol prepared by adding PO to o-toluenediamine/diethanolamine (molar ratio of 75:25), having a hydroxyl value of 450 mg KOH/g.
Polyol M
  Polyol prepared by adding PO to sugar/propylene glycol (molar ratio of 80:20) as a starting material, having a hydroxyl value of 380 mg KOH/g.
Polyol N
  Polyol prepared by addition-polymerizing PO to propylene glycol as a starting material, having a hydroxyl value of 500 mg KOH/g.

By using, as a main portion of a polyol, a polyether polyol prepared by addition-polymerizing an alkylene oxide to o-toluenediamine as an initiator and by using cyclopentane and water as a blowing agent, a rigid polyurethane foam having improved thermal conductivity can be obtained. The density of the foam can be reduced by improving the thermal conductivity.

What is claimed is:

1. A process for the production of a rigid polyurethane foam comprising reacting
   a) an aromatic polyisocyanate; and
   b) a polyether polyol prepared by addition polymerizition of a mixture of o-toluenediamine and diathanolamine with an alkylene oxide;
in the presence of
   c) a blowing agent comprising cyclopentane and water in an amount up to 1.0 parts by weight for every 100 parts by weight of polyether polyol b);
and optionally in the presence of at least one of
   d) a catalyst;
   e) a surfacant; and
   f) a processing aid.

2. The process of claim 1 in which polyether polyol b) has a hydroxyl value of from 350 to 550 mg KOH/g.

3. The process of claim 1, wherein the amount of cyclopentane in said blowing agent c) is from 15 to 40 parts by weight.

4. The process of claim 1, wherein the amount of cyclopentane in said blowing agent c) is from 18 to 25 parts by weight.

5. The process of claim 1 in which blowing agent c) is composed of from 18 to 21 parts by weight of cyclopentane and from 0.1 to 0.7 parts by weight of water for every 100 parts by weight of polyol.

6. A rigid polyurethane foam produced by the process of claim 1.

7. A rigid polyurethane foam produced by the process of claim 5.

* * * * *